March 10, 1931.  O. H. BANKER  1,795,464
TRANSMISSION
Filed Oct. 21, 1927   4 Sheets-Sheet 2
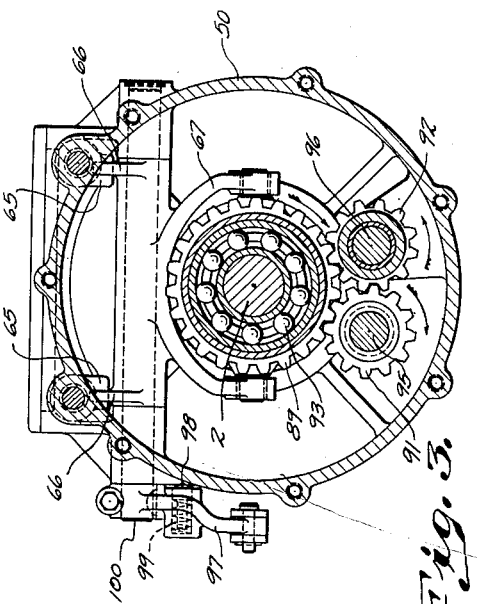
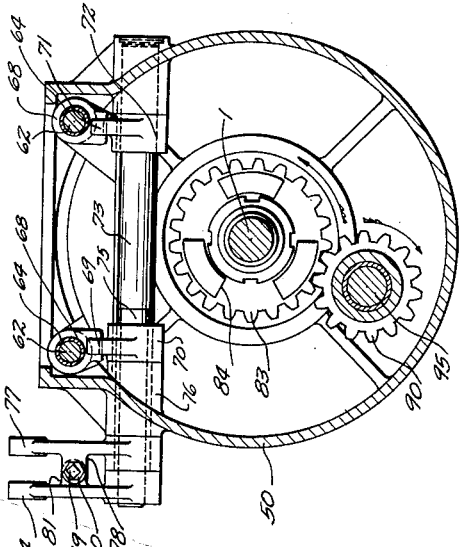
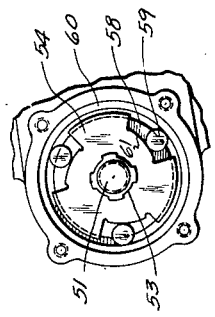
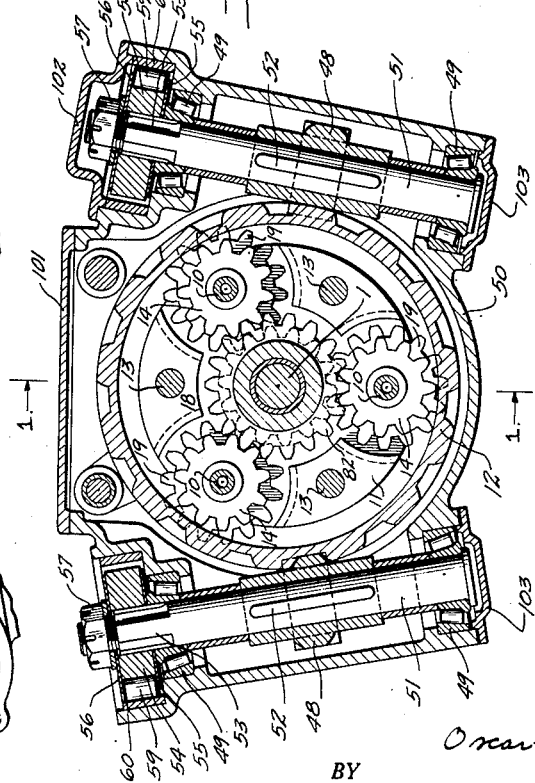
INVENTOR.
Oscar H. Banker
BY
Searles & French
ATTORNEYS March 10, 1931.                O. H. BANKER                1,795,464
                                TRANSMISSION
                             Filed Oct. 21, 1927          4 Sheets-Sheet 3

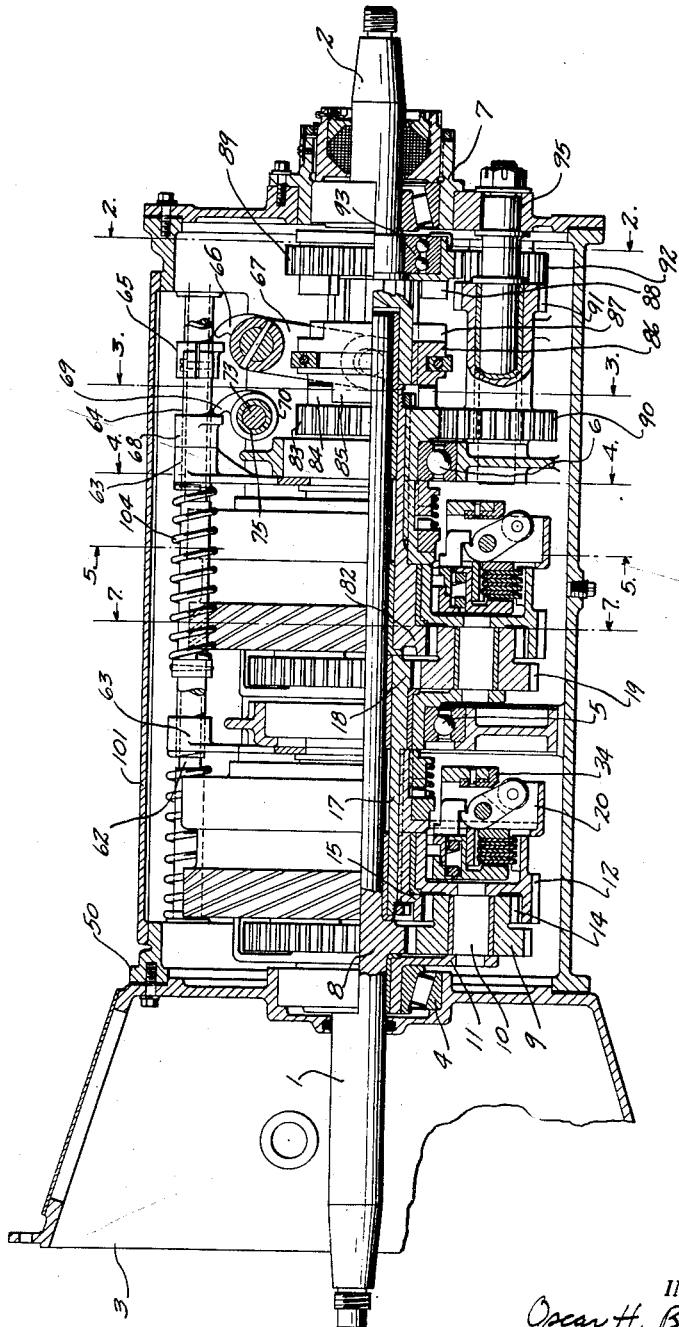

INVENTOR.
Oscar H. Banker
BY
Charles J. French
ATTORNEYS

March 10, 1931.   O. H. BANKER   1,795,464
TRANSMISSION
Filed Oct. 21, 1927   4 Sheets-Sheet 4

INVENTOR.
Oscar H. Banker
BY
Charles French
ATTORNEYS

Patented Mar. 10, 1931

1,795,464

UNITED STATES PATENT OFFICE

OSCAR H. BANKER, OF PHILADELPHIA, PENNSYLVANIA, ASSIGNOR TO CONTINENTAL ILLINOIS BANK AND TRUST COMPANY, OF CHICAGO, ILLINOIS, A CORPORATION OF ILLINOIS, TRUSTEE

TRANSMISSION

Application filed October 21, 1927. Serial No. 227,828.

The object of this invention is to devise a novel construction and arrangement of a transmission which is automatic in operation but which can be selectively controlled by the operator to maintain any desired speed for which the transmission is designed.

A further object of the invention is to devise a novel transmission wherein the driving shaft extends through and has mounted on it one or more governor control units and one governor unit automatically controls the next governor unit in accordance with the load on the transmission.

It further comprehends a novel construction and arrangement of a governor unit and novel means for controlling it.

It further comprehends a novel construction and arrangement of a speed responsive device.

It further comprehends a novel construction and arrangement of reversing mechanism.

It further comprehends a novel transmission wherein the driving and driven shafts are operatively connected by means of a plurality of governor units, one governor unit of which controls the next governor unit, and wherein means are provided to selectively lock said governor units to determine the speed relation between said shafts.

Other novel features of construction and advantage too numerous at this time to specifically mention, will hereinafter more clearly appear in the detailed description and the appended claims.

For the purpose of illustrating the invention, I have shown in the accompanying drawings, a typical embodiment of it, which, in practice, will give satisfactory and reliable results. It is however, to be understood that the various instrumentalities of which my invention consists can be variously arranged and organized, and my invention is not limited to the exact arrangement and organization of these instrumentalities, as herein set forth.

Figure 1 is a sectional view on line 1—1 of Figure 7, of a transmission embodying my invention.

Figure 2 is a section taken on line 2—2 of Figure 1.

Figure 3 is a section taken on line 3—3 of Figure 1.

Figure 6 is a top plan view of the pin clutch.

Figure 7 is a section on line 7—7 of Figure 1.

Similar numerals of reference indicate corresponding parts.

Referring to the drawings:—

Figure 4:
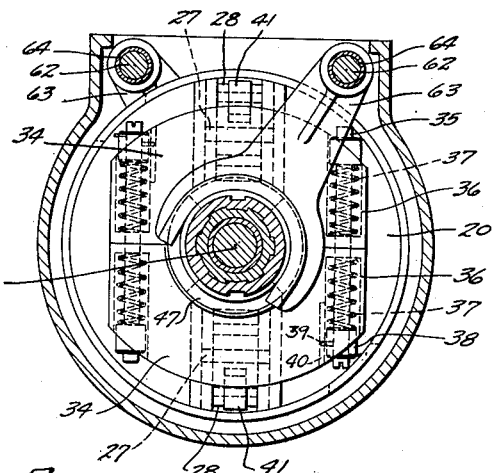
Figure 4 is a section taken on line 4—4 of Figure 1.

1 designates the driving shaft of the transmission, which it will be understood, is the clutch shaft which is operatively connected with the engine to be driven thereby, and 2 designates the driven shaft which is adapted to be connected in any desired manner to the mechanism to be driven and controlled.

The shaft 1 is journalled in the clutch housing 3 which is provided with an anti-friction bearing 4 and it is also journalled in the anti-friction bearings 5 and 6. The driven shaft 2 is recessed to receive the free end of the shaft 1 and is journalled in an anti-friction bearing 7.

The shaft 1 has connected with it, and preferably integral with it, a gear 8 which meshes with a gear 9 mounted on a stud shaft 10 carried by a spider 11 loosely mounted on the shaft 1 and also carried by a lock pinion 12. The spider 11 and the lock pinion 12 are fixedly connected together by means of bolts 13, see Figures 10 and 7, so that they are held together as a unit of structure and revolve in unison and from the planetary gear carrier.

The gear 9 is a compound gear having connected to it the gear 14 which meshes with a gear 15 which is splined at 16 to a sleeve 17 which is loosely mounted on the driving shaft 1. The sleeve 17 at its forward end is provided with a single gear 18 which meshes with a gear 19 of the next control unit and corresponding to the gear 9 so that one control unit effects the drive of the next control unit. The spline 16 also serves to connect with the sleeve 17 the governor disc 20, see Figure 10.

The lock pinion 12 which is loosely mounted on the hub of the gear 15, see Figure 1, is provided with an outer flange 21 provided on its inner periphery with clutch keys 22 which cooperate with the driven disc or clutch plates 23 in the usual and well known manner.

The governor disc 20 is provided with a laterally extending ring 24 which is keyed to the driving disc or clutch plates 25 which cooperates with the driven disc or clutch plates 23. The stack of driving and driven discs is disposed between a pressure plate 26 and the back face of the governor disc 20. The governor disc 20 has fulcrumed in it at 27, a lever 28. The lever 28 has one end provided with a hook 29 which is adapted to engage with the hooked end 30 of a member 31 forming part of a tension controlling device. This device consists of a flat helical spring 32 which is cased in the members 31 and the pressure plate 26 by means of fastening devices such as the threaded connections 33, see Figure 10.

Each governor disc 20 has slidably mounted on its side, a pair of governor blocks or weights 34 through which pass the floating studs 35 and the blocks are recessed as at 36 to form pockets to receive springs 37 which encircle the floating studs 35. The lower end of the stud is provided with a nut 38, in threaded engagement with it, and provided with a pin 39 which is slidable in a keyway 40 on one of the governor weights 34. The nuts 38 are locked in their adjusted position in any desired manner, see Figure 4.

Figure 8:
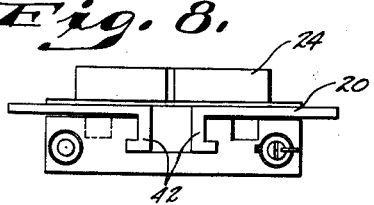
Figure 8 is a plan view of the governor guides.
Figure 10:
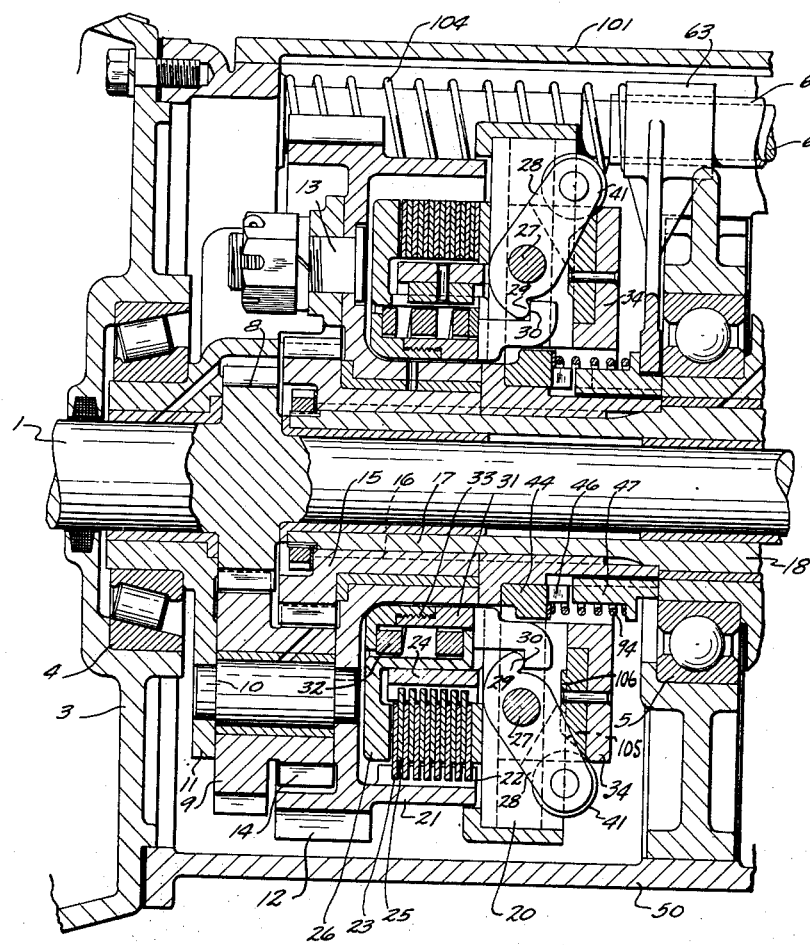
Figure 10 is a full size sectional view of the first planet and the governor control unit.

The governor weights 34 are adapted to travel in the path of a roller 41 mounted on the free end of a lever 28, see Figure 10. The manner in which the governor weights 34 are slidably keyed on their respective governor disc 20, is best seen in Figure 8, from which it will be seen that each disc 20 is provided with the guides 42 on which the governor weights 34 are slidable. Each governor weight 34 has fixed to it a rack 43 which meshes with a pinion 44 which is loosely mounted on the hub 45 of a governor disc 20.

Figure 9:
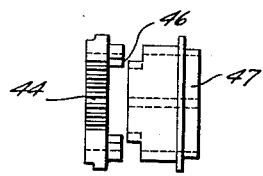
Figure 9 is a view showing the governor locking clutches.

The pinion 44 has on one face, the clutch members 46 which cooperate with clutch members 47 which are shouldered to receive a spring 94 which normally tends to separate the clutch members 46 and 47, see Figures 9 and 10. The clutch member 47 is slidably keyed on the hub 45 of the governor disc 20.

Each lock pinion 12 is in mesh with a pair of diametrically opposed gears 48. The gears 48 are journalled in anti-friction bearings 49 in the housing 50 of the transmission and are carried by their respective shaft 51 which is connected with its gear 48 by a key 52. The gears 48, as noted in the drawing, are reduction gears driving the shafts 51 at a reduced speed to that of the pinions 12, thereby conserving the life of the clutches associated therewith. The upper end of each shaft 51 is splined at 53 to a pin brake member or actuator 54. The pin brake member or actuator 54 is mounted between the washers 55 and 56, the washer 56 having bearing against it a nut 57, see Figure 7.

The pin brake member 54 has its periphery recessed to form pockets 58 within which are contained rollers 59 which bear against an outer hardened steel wall 60, and the inner wall of the pocket 58 which forms a cam surface 61. This permits a pin brake member 54 and its adjuncts to revolve freely in one direction and provides a frictional resistance and lock to its revolution in the opposite direction.

The intergeared connection between the planetary gear carrier and the automatic one-way brake above described has several important advantages. It permits the actuator member 54 to be made small in diameter, thus reducing its peripheral speed and hence wear on the rollers 59. It permits the automatic brake being disposed at a position where it is readily accessible for inspection, repair or replacement without dismantling the transmission and the bearing for the shaft 51 and the actuator provides a means for preventing the oil from the transmission casing carrying objectionable foreign particles, such as dirt, grit or metal, into the space containing the brake. Also, brakes of the type herein described are sensitive to shock, but by intergearing most of the shock is absorbed by the gearing before it reaches the brake. Finally, by employing an intergeared connection within the zone of the pinions of the planetary gear unit the overall dimensions of the transmission are not increased and hence the transmission is more compact than those heretofore proposed.

The housing 50 has mounted in it the guide rods 62, each of which is provided with a shifting fork 63 which is in forked engagement with the clutch members 47, see Figure 4. The hubs of the fork 63 are fixedly mounted on the sleeves 64 on the guide rods 62. Each sleeve 64 has fixed to it a collar 65, see Figure 1, with which is adapted to contact the free end 66 of the clutch fork 67, see more particularly Figure 2.

The sleeve 64 has also fixed to it a collar 68 one portion of which cooperates with the member 69 of a clutch control finger 70 while the other cooperates with a member 71 of a clutch control finger 72, see more particularly Figure 3.

The clutch controlling finger 72 is fixed to a shaft 73 the outer end of which is provided with a controlling lever 74 which leads to a position accessible to the operator. The clutch control finger 70 is fixed to a sleeve 75 loosely mounted on the shaft 73 and mounted in a journal 76 in the housing 50.

The sleeve 75 which carries the clutch control finger 70 has connected with it a lever 77 which extends into a position accessible to the operator. The lever 77 is provided with a boss 78 in which is mounted a set screw 79 provided with a lock nut 80. This set screw 79 is adapted to contact with a boss 81 on the lever 74.

The gear 14 of the second governor control unit meshes with a gear 82, the hub of which is loosely mounted on the shaft 1 and carries the lock pinion 12 of said second unit and also the governor disc 20, and at its free end it has splined to it a gear 83, see Figure 1.

The gear 83 has a clutch face 84 which cooperates with a clutch face 85 on a clutch member 86, the outer face of the clutch member 86 is provided with the clutch 87 which cooperates with the clutch members 88 on the reverse gear 89. The clutch member 86 is splined to the driven shaft 2 and is slidable thereon.

In order to obtain the reverse, the gear 83 meshes with a gear 90, the hub of which is provided with a gear 91, which meshes with the reverse idler 92. The idler 92 meshes with the reverse gear 89 which is loosely mounted by means of an anti-friction bearing 93 on the driven shaft 2, see Figures 1, 2 and 3.

The governor weights 34 have the inclined faces 105 and the dwells 106 so that when a roller 41 reaches a dwell 106 the clutch is locked and the lever 28 is in dwell. Any increase in governor speed to further expand the governor will not vary the positions of the levers 28.

When the governor weights retract the clutch is not declutched until the rollers 41 ride down the inclined faces 105. In other words, the clutch is not declutched until a predetermined decrease in engine speed has been effected.

The operation will now be readily apparent to those skilled in this art and is as follows.

Assuming the engine is operatively connected with the driving shaft 1 and is in clutched engagement therewith it will be apparent that the driving shaft 1 will revolve thereby causing the revolution of the pinion 8 which is fixedly connected with it. This causes the gear 9 of the first planetary gear unit to revolve, and because the gear 15 is heavily loaded and does not easily revolve, the gears 9 will revolve about the gears 15 in a direction opposite to the direction of rotation of the driving shaft 1.

The gears 9 of the planet unit being connected with the locking pinions 12, and as the gears 14 are trying to revolve about the gears 15, the lock pinions 12 bodily revolve with them. The lock pinions 12 are in mesh with lock gears 48, being keyed to the shafts 51, and the shafts 51 carrying at their outer ends pin brakes 54, are so constructed that they can revolve in only one direction so that the effort of lock pinions 12 to turn in opposite direction automatically causes the pin brakes to lock. Therefore, while in that locked position lock pinion 12 and spider 11 become stationary and cause gear 15 to revolve. This gear 15 then transmits the power to the next planetary gear unit, the operation of which is identical, so that the power is transmitted to the gear 83 and through the clutch member 86 to the driven shaft 2.

This produces the first or low speed. While driving at this speed, and the car gains momentum, the revolution of gear 15 causes the governor disc 20 to revolve in unison with it, and the governor disc reaching a predetermined speed causes the governor weights 34 to expand, thereby coming in contact with the rollers 41 at the free ends of the levers 28. The hooked ends 29 of these levers 28 press on the shoulders 30 of the tension member 31. The governor weights 34 extend to their full expansible position causing the levers to act and place a tension on the springs 32, the opposite end of these springs being in contact with the pressure plate 26, causes the pressure plate 26 to press the driving and driven discs together and lock them as one unit.

This locking into one unit causes the lock pinion 12 and all of the planetary gear units of the first planetary unit, to revolve as one unit in the direction of rotation, also automatically releasing the pin brakes 54 which revolve therewith.

It will thus be seen that the first planet unit is driving at engine speed and is driving the second planet unit. The operation of the second planet unit is similar to that already described in connection with the first planet unit, so that when the two units are in locked engagement, all the parts are in direct drive and the driven shaft is being driven at the same speed as the driving shaft.

It will, of course, be understood that the progressive action of the governor-operated clutches takes place due to the fact that the relation of the springs 37 and the masses or weights 34 of the second governor unit are designed to allow the weights of this unit to become operative to shift the clutch levers 28 at a higher rate of speed of the driven shaft than that required for the weights of the first governor unit to overcome their springs to operate the clutch of the first change speed unit.

Assuming that the load on the driven shaft 2 increases to such an extent that the engine speed will be reduced causing the second governor unit to assume its retracted position thereby releasing the drive clutch of the second unit, the lock pinions lock again through the brakes as explained before, and causes the driven shaft 2 to be operated at its intermediate or second speed relatively to the engine speed.

*Explanation of the manual control*

When the operator of the car wishes to back up or reverse the car, he pushes on the lever 97 which is attached to the shaft 100, on the inner side of which is attached or keyed the clutch shifting fork 67 as shown in Figure 2, and particularly in Figure 1. The clutch face 87 enters into engagement with the clutch face 88 on the reverse gear 89 driven through the train of reversing gears 90, 91 and 92.

Figure 5:
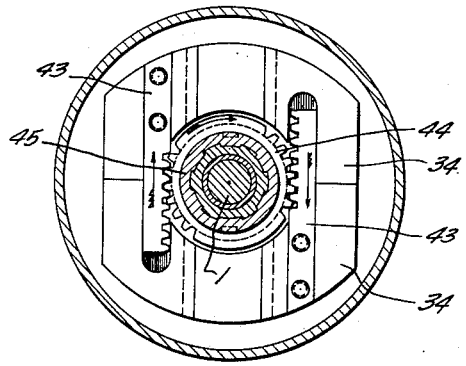
Figure 5 is a section on line 5—5 of Figure 1.

It will be clear from Figures 1 and 2, that when the fork 67 is in reverse position, the fingers 66 come in with and push collars 65 mounted on sleeves 64 slidably mounted on the shaft 62. The other end of the sleeve 64 is fastened to the fork 63 which pushes the clutch 47 into engagement with the clutch face 46 on the face of the governor control gear 44, as seen in Figure 5. Thus the governors 34 are locked in their contracted position and thereby the reverse motion of the shaft 2 is maintained constantly at a low speed to check against any accidental or quick backing.

For a forward motion of the car, the operator pulls on the lever 97 as shown in Figure 2, and the lever 97 is provided with a plunger 98, acting upon it with the spring 99, and recesses or holes are provided in the housing 50 to hold the lever 97 in any desired position so that the clutch fork 67 will not move out of its position while the car is in motion.

As will be seen in Figure 1, the clutch face 85 on the clutch 86 engaging with the clutch teeth 84 on the gear 83, causes the driven shaft 2 to be locked as one unit with the gear 83. While the transmission is in operation, this is the forward drive for the car.

Assuming now that the driver wishes to lock his transmission in an intermediate speed, he pulls on the lever 74, see Figure 3, and the finger 69 on the clutch control 70, the finger 69 bearing upon the collar 68 will push the sleeve 64, which in turn will push the clutch control finger 63 attached at the other end of it. This also will bring the governor control clutch for the second speed in locked engagement, causing the second speed governor to be locked in its contracted position, thereby causing the intermediate or the second planetary gear unit to be in an operative position and to remain in such position as long as the operator desires it.

If the operator desires to lock the transmission in the low speed, then he pulls on the lever 77 which has a boss extending to the left as at 78, which also carries set screw 79 locked with lock nut 80. The point of the set screw 79 bears upon the boss 81 of the other lever 74; thus the pull on the lever 77 automatically causes the lever 74 to move in unison with it, causing both of the control fingers 69 and 71, respectively, to push on the collars 68, as shown in Figure 3, and causes both of the governors to lock in their contracted position, thereby causing both of the planetary gear units to be in operative position, and reduces the speed of the car to a lower speed for as long a period as the operator desires. A movement of the levers 74 and 77 bring them into their normal or inoperative position and automatically brings the clutch forks 63 which are pushed to their normal position by springs 104, and unlocks the governors from their retracted position, causing the transmission to return to its fully automatic condition.

When the operator stops the car and wishes to put the transmission in neutral position, he moves the lever 97 to its middle or neutral position, and the plunger 98 locates itself in a hole provided for it, and causes the clutch fork 67 to be retained in such position.

Referring to Figure 5, it will be seen that when the governor blocks 34 carry the racks 43, and when governors expand, the racks travel in the direction of the arrow, and the control gear 44 takes a twisting action to the direction shown by the arrow. When this gear is locked by clutch 47, as shown in Figure 9, it cannot move or twist, and thereby holds the governor weights 34 in their retracted position.

Referring to Figure 9, if the operator tries to lock the governors while they are in their open or expanded position, it will be impossible to engage the clutch, because of the fact that they are flat faced and square shouldered, therefore any effort to close the clutch 47 will simply bring two flat surfaces together and can accomplish nothing until the governors are in their retracted position, thereby bringing the two clutches in line for an engageable position. This will insure any danger of engaging these clutches at any other time and will prevent injury to the mechanism.

In Figure 4, the governors are balanced or equalized by floating bolts 35, and the springs 37 are housed in recesses 36 in the governor weights 34. If for any reason one spring is stronger than the spring of its opposite pair, the floating bolt 35 will compensate for the difference by pulling on both springs equally. The governor weights 34, being of equal weight, when they are spinning they will expand or travel the same amount from the center line of their rotative plane, and when the springs in their respective pockets are different in tension, one being stronger than the other, will not be held back or travel further one from the other, because the bolt 35 will move freely and equalize the pull on the springs, thereby automatically keeping the weights always in equalized position.

It will now be apparent that I have devised a new and useful transmission which embodies the features of advantage enumerated as desirable in the statement of the invention and the above description, and while I have, in the present instance, shown and described a preferred embodiment thereof which will give in practice satisfactory and reliable results, it is to be understood, however, that this embodiment is susceptible of modification in various particulars without departing from the spirit or scope of the invention or sacrificing any of its advantages.

Having thus described my invention what I claim as new and desire to secure by Letters Patent, is:—

1. In a transmission, the combination of a driving and a driven shaft, governor controlled change speed units through which said driving shaft extends and by which they are carried, with one governor unit for each speed other than high speed and with one governor unit connected in series with and automatically controlling the next governor unit in accordance with the load on the transmission.

2. In a transmission, a driving shaft, the combination of a planetary gear carrier, planetary gears mounted on said carrier and intergeared with said driving shaft, a clutch to lock said carrier to revolve in unison with said driving shaft, a driven shaft, a governor controlled by said driven shaft and controlling said clutch, and an automatic brake reducedly intergeared with said gear carrier to lock it against revolution in one direction.

3. In a transmission, a driving shaft, the combination of a planetary gear carrier, planetary gears mounted on said carrier and intergeared with said driving shaft, a clutch to lock said carrier to revolve in unison with said driving shaft, a driven shaft, a governor controlled by said driven shaft and controlling said clutch, and a plurality of automatic brakes intergeared with said gear carrier to lock it against revolution in one direction.

4. In a transmission, the combination of a driving and a driven shaft, a plurality of governor controlled change speed units operatively connected with said shafts with one governor unit controlling the next governor unit, and means to selectively lock said governor units to determine the speed relationship between said driving and driven shafts.

5. In an automatically variable change speed transmission, the combination of a drive shaft, a driven shaft, a planetary gear unit between said shafts, including planet pinions and a planetary gear carrier, a clutch for connecting the planetary gear carrier of said unit to its driven gear, a governor controlled by the speed of the driven shaft and controlling said clutch, and a one-way automatic brake intergeared with said carrier in the zone of the pinions to prevent its tendency to move backward.

6. In an automatically variable change speed transmission, the combination of a drive shaft, a driven shaft, change speed gear units between said shafts, a clutch for controlling each change speed gear unit, a speed-responsive device controlling each clutch, control means for each speed-responsive device including a locking device, and manually controlled means for simultaneously operating said locking devices.

7. In an automatically variable change speed transmission, the combination of a drive shaft, a driven shaft, change speed gear units between said shafts, a control clutch for each change speed gear unit, a speed-responsive device controlling each clutch, control means for each speed-responsive device including a locking device, and manually-controlled means to simultaneously or selectively actuate said locking devices to determine the speed relationship between said driving and driven shafts.

8. In an automatically variable change speed transmission, the combination of a drive shaft, a driven shaft, a change speed gear unit between said shafts, a control clutch for said change speed gear unit, a governor controlling said clutch, manually-controlled means associated with said governor to lock it in one of its extreme positions, and means for preventing the operation of said locking means when the governor is in an intermediate position.

9. In an automatically variable change speed transmission, the combination of a drive shaft, a driven shaft, a casing, a governor-controlled planetary gear unit in said casing operatively connected with said shafts, and an automatic brake in said casing intergeared with the planetary gear carrier of said unit to prevent its reverse rotation, said casing having a removable cover section for said brake permitting its inspection or repair without disassembling said planetary gear unit.

10. In an automatically variable change speed transmission, the combination of a drive shaft, a driven shaft, a plurality of governor-controlled speed change units operatively connected with said shafts with one governor unit controlling the next governor unit, reverse gearing, a reverse gearing control, and means operable by said control to simultaneously lock said governor units against operation while actuating said reverse gearing.

11. In an automatically variable change speed transmission, the combination of a drive shaft, a driven shaft, a planetary gear unit between said shafts, a clutch for connecting the planetary gear carrier of said unit to its driven gear, a governor controlled by the speed of the driven shaft and controlling said clutch, a spiral gear on said planetary gear carrier, a shaft having its axis disposed at an angle to said first-named shafts and carrying a spiral gear meshing with said first-named gear, and an automatic brake having its actuator driven by said last-named shaft and acting automatically to prevent the tendency of said carrier to move backward.

12. In an automatically variable change speed transmission, the combination of a drive shaft, a driven shaft, a planetary gear unit between said shafts including a planetary gear carrier, a clutch for connecting said planetary gear carrier to its driven gear, a governor controlled by said driven shaft and controlling said clutch, a one-way automatic brake intergeared with said carrier and having an actuator of smaller diameter than the gear of said planetary carrier, and means preventing the passage of objectionable foreign matter from the interior of the transmission to said brake.

OSCAR H. BANKER.